(12) United States Patent
Egawa et al.

(10) Patent No.: US 10,490,831 B2
(45) Date of Patent: Nov. 26, 2019

(54) FUEL CELL SYSTEM

(71) Applicant: TOYOTA JIDOSHA KABUSHIKI KAISHA, Toyota-shi, Aichi-ken (JP)

(72) Inventors: Toshihiro Egawa, Okazaki (JP); Masahiro Okuyoshi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 112 days.

(21) Appl. No.: 15/957,145

(22) Filed: Apr. 19, 2018

(65) Prior Publication Data

US 2018/0331375 A1    Nov. 15, 2018

(30) Foreign Application Priority Data

May 12, 2017    (JP) .................................. 2017-095299

(51) Int. Cl.
| | |
|---|---|
| *H01M 8/04082* | (2016.01) |
| *H01M 8/04089* | (2016.01) |
| *H01M 8/04111* | (2016.01) |
| *H01M 8/0438* | (2016.01) |
| *H01M 8/04746* | (2016.01) |

(52) U.S. Cl.
CPC .... *H01M 8/04104* (2013.01); *H01M 8/04111* (2013.01); *H01M 8/04201* (2013.01); *H01M 8/04388* (2013.01); *H01M 8/04753* (2013.01)

(58) Field of Classification Search
None
See application file for complete search history.

(56) References Cited

U.S. PATENT DOCUMENTS

2010/0233581 A1*  9/2010  Katano ............. H01M 8/04089
                                                      429/513
2010/0248061 A1*  9/2010  Ishikawa ........... H01M 8/04089
                                                      429/443

FOREIGN PATENT DOCUMENTS

JP    2011-204411 A    10/2011

OTHER PUBLICATIONS

JP2011204411A—machine translation (Year: 2011).*

* cited by examiner

*Primary Examiner* — Haroon S. Sheikh
(74) *Attorney, Agent, or Firm* — Dickinson Wright, PLLC

(57)    ABSTRACT

It is possible to suppress errors remaining in the measurement by a pressure sensor. A fuel cell system includes a fuel cell, a tank storing fuel gas, a fuel gas supply flow path feeding the fuel gas from the tank to the fuel cell, a first pressure reduction unit reducing pressure of the fuel gas and feeding the fuel gas, a first pressure sensor measuring pressure in the fuel gas supply flow path, a second pressure sensor measuring pressure in the fuel gas supply flow path, a switching valve switching execution and stop of supply of the fuel gas, a correction unit correcting the first pressure sensor based on a second measurement value measured by the second pressure sensor, and a controller controlling the fuel cell system. The controller performs, when the switching valve stops supply of the fuel gas and a first measurement value is larger than a predetermined value, pressure reduction processing to make the first measurement value equal to or smaller than the predetermined value, and then controls the correction unit to correct the first pressure sensor.

6 Claims, 4 Drawing Sheets

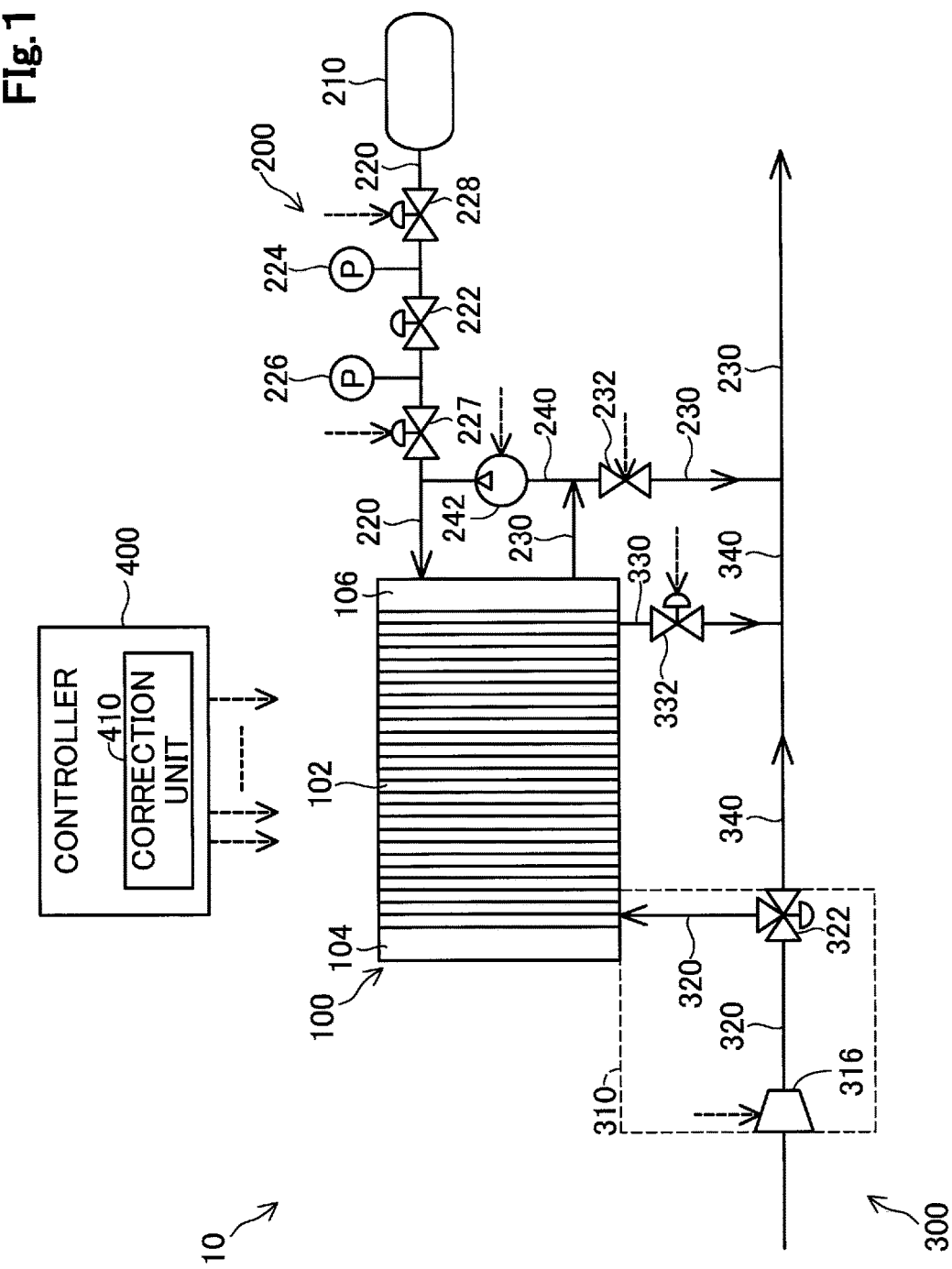

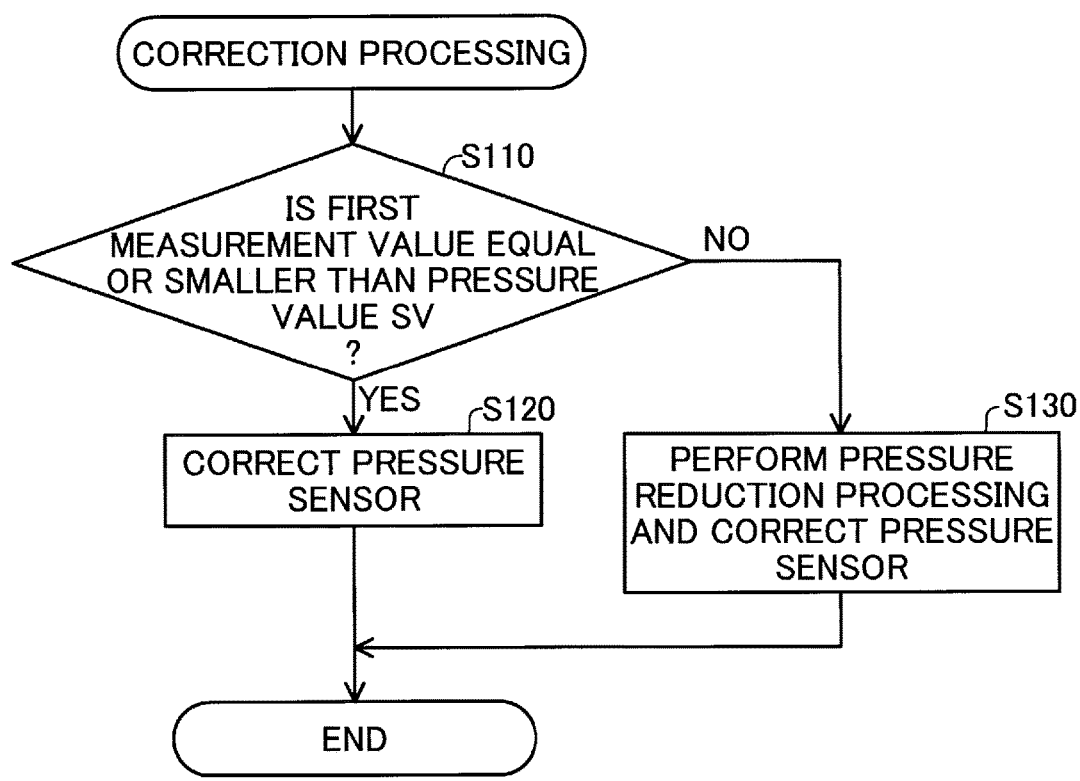

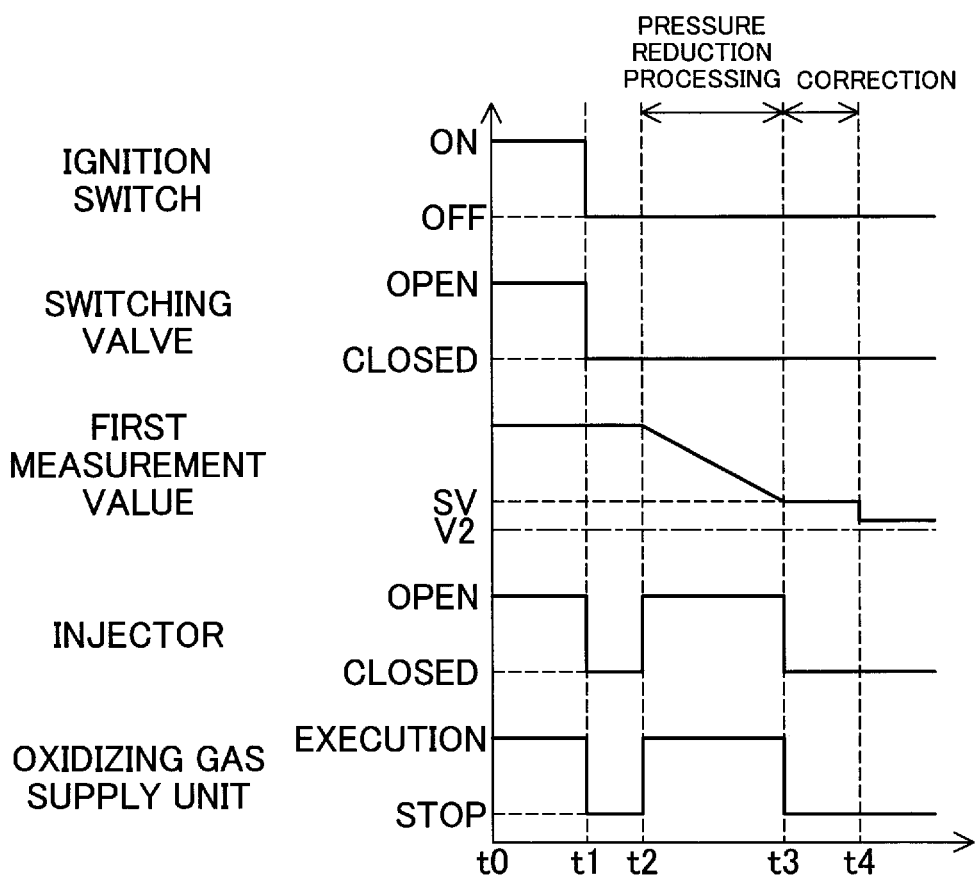

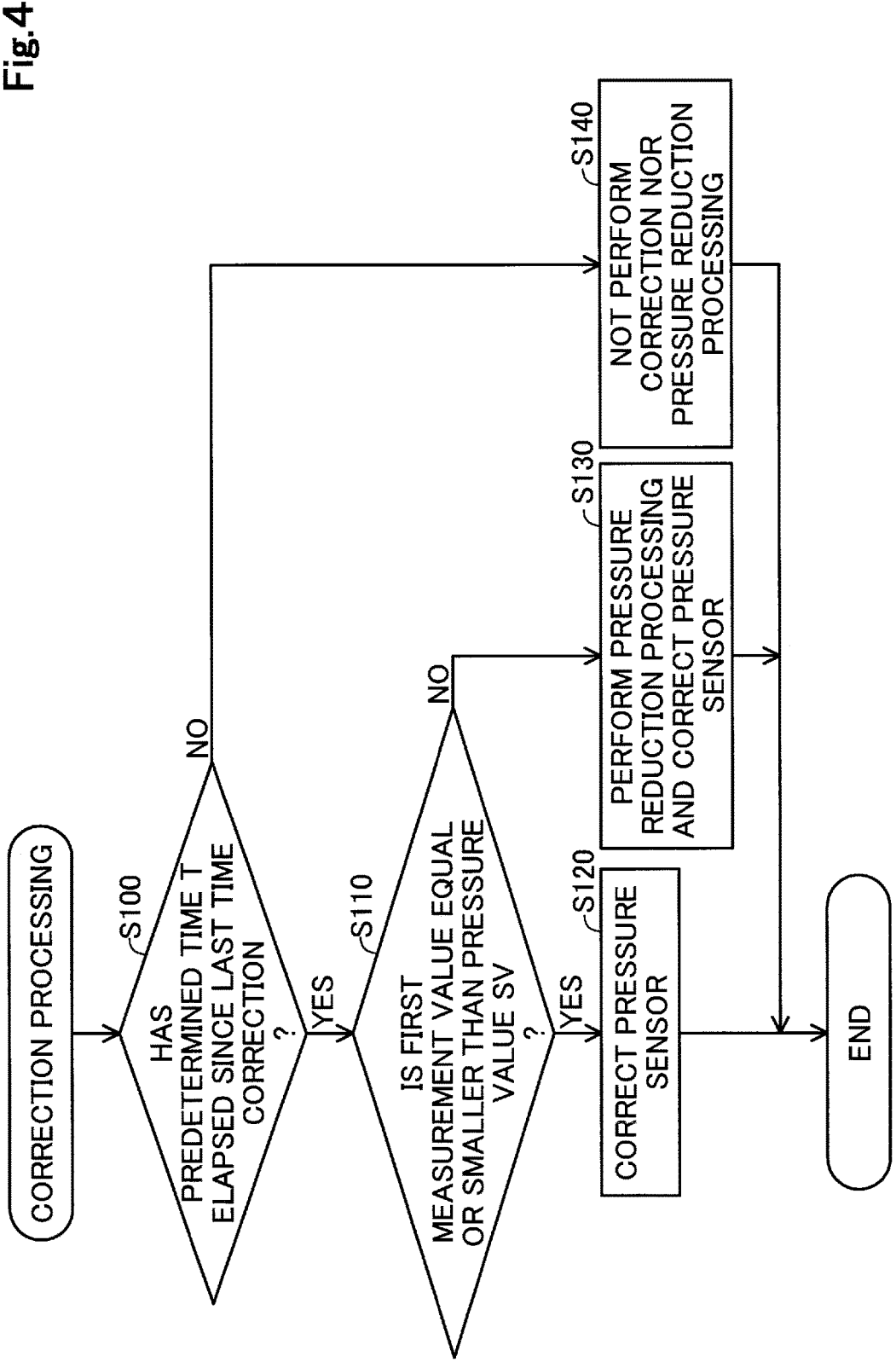

FUEL CELL SYSTEM

CROSS-REFERENCE TO RELATED APPLICATIONS

The present application claims priority from Japanese patent application 2017-095299 filed on May 12, 2017, the entirety of the content of which is hereby incorporated by reference into this application.

BACKGROUND

Field

The present disclosure relates to a fuel cell system.

Related Art

A fuel cell system may include a fuel cell, a tank that stores fuel gas used for generating power of the fuel cell, and a fuel gas supply flow path that feeds the fuel gas supplied from the tank to the fuel cell. Such a fuel cell system is mounted on a vehicle as a power source of the vehicle, for example. To select, in filling fuel gas in the tank, an appropriate filling speed and filling flow rate, or to prevent stop of a vehicle due to fuel gas shortage, it is necessary to accurately grasp pressure in the tank. In the fuel cell system of JP 2011-204411 A, there is corrected a pressure sensor (first pressure sensor) provided in a fuel gas supply flow path to measure pressure in the tank. To be more specific, when a first measurement value measured by the first pressure sensor becomes equal to or smaller than a predetermined value, the first pressure sensor is corrected based on a second measurement value measured by a second pressure sensor provided on the downstream side of the first pressure sensor.

In the fuel cell system of JP 2011-204411 A, the first pressure sensor is not corrected until the first measurement value becomes equal to or smaller than a predetermined value. Thus, when the tank is filled with fuel gas before the first measurement value becomes equal to or smaller than a predetermined value, for example, there may remain an error occurred in measurement by the first pressure sensor. To solve such a problem, there is demanded the technology for suppressing errors remaining in the measurement by the pressure sensor provided in the fuel gas supply flow path.

SUMMARY

In accordance with one aspect of the disclosure, a fuel cell system is provided. The fuel cell system includes a fuel cell, a tank that stores fuel gas used for generating power of the fuel cell, a fuel gas supply flow path that is connected to the tank to feed the fuel gas supplied from the tank to the fuel cell, a first pressure reduction unit that is provided in the fuel gas supply flow path and adjusts opening and closing of the fuel gas supply flow path to reduce pressure of the fuel gas and feed the fuel gas, a first pressure sensor that is provided in the fuel gas supply flow path on an upstream side of the first pressure reduction unit in a feeding direction of the fuel gas to measure pressure in the fuel gas supply flow path, a second pressure sensor that is provided in the fuel gas supply flow path on a downstream side of the first pressure reduction unit to measure pressure in the fuel gas supply flow path, a switching valve that is provided in the fuel gas supply flow path on the upstream side of the first pressure sensor to switch execution and stop of supply of the fuel gas, a correction unit that corrects the first pressure sensor based on a second measurement value measured by the second pressure sensor, and a controller that controls the fuel cell system, in which the controller controls the correction unit to correct the first pressure sensor when the switching valve stops supply of the fuel gas and a first measurement value measured by the first pressure sensor is equal to or smaller than a predetermined value, and performs, when the switching valve stops supply of the fuel gas and the first measurement value is larger than the predetermined value, pressure reduction processing to make the first measurement value equal to or smaller than the predetermined value, and then controls the correction unit to correct the first pressure sensor.

BRIEF DESCRIPTION OF DRAWINGS

FIG. 1 is an explanatory diagram illustrating a configuration of a fuel cell system according to a first embodiment;

FIG. 2 is a flow illustrating correction processing performed by a controller;

FIG. 3 is a timing chart exemplifying state changes after an ignition switch is turned off; and FIG. 4 is a flow illustrating correction processing performed by a controller according to a third embodiment.

DETAILED DESCRIPTION

A. First Embodiment

A1. Configuration of Fuel Cell System

FIG. 1 is an explanatory diagram illustrating a configuration of a fuel cell system 10 according to a first embodiment of the disclosure. The fuel cell system 10 is mounted on a vehicle, and outputs power used mainly as driving power of a vehicle, in accordance with a request from a driver. The fuel cell system 10 includes a fuel cell 100, a fuel gas supply and discharge system 200, an oxidizing gas supply and discharge system 300, and a controller 400.

The fuel cell 100 is a solid polymer type fuel cell that receives supply of hydrogen (fuel gas) and air (oxidizing gas) as reaction gas and generates power by electrochemical reaction between oxygen and hydrogen. The fuel cell 100 has a stacking structure in which a plurality of single cells 102 are stacked. Each of the single cells 102 is a power generation element capable of generating power individually, and includes a membrane electrode assembly that is a power generation element formed of an electrolyte membrane with electrodes arranged on both surfaces thereof, and two separators (not illustrated) sandwiching the membrane electrode assembly. The electrolyte membrane is a solid polymer thin film exhibiting favorable proton conductivity when it is wet with water contained therein. On the outer peripheral end of each single cell 102, there is provided a manifold for reaction gas (not illustrated) extended in the stacking direction of the single cells 102 and branched to a power generation part of each single cell 102. The stacked single cells 102 are sandwiched and tightened by end plates 104, 106 in the stacking direction.

The fuel gas supply and discharge system 200 includes a fuel gas supply function, a fuel gas discharge function, and a fuel gas circulatory function. The fuel gas supply function is a function for supplying fuel gas to an anode of the fuel cell 100. The fuel gas discharge function is a function for discharging fuel offgas discharged from the anode of the fuel cell 100 to the outside. The fuel gas circulatory function is a function for allowing fuel gas to circulate in the fuel cell system 10. In the first embodiment, the fuel gas is hydrogen gas.

The fuel gas supply and discharge system 200 includes a tank 210, a fuel gas supply flow path 220, a regulator 222, a first pressure sensor 224, a second pressure sensor 226, an injector 227, and a switching valve 228.

The tank 210 stores fuel gas used for generating power of the fuel cell 100. The fuel gas supply flow path 220 connects the fuel cell 100 with the tank 210, and feeds fuel gas supplied from the tank 210 to the fuel cell 100.

The regulator 222 is provided in the fuel gas supply flow path 220. The regulator 222 adjusts opening and closing of the fuel gas supply flow path 220 to reduce pressure of fuel gas, and feeds the fuel gas to the side of the fuel cell 100. The regulator 222 is a diaphragm type regulator. In the first embodiment, the adjustment of opening and closing of the fuel gas supply flow path 220 by the regulator 222 is autonomously performed, in accordance with the pressure on the upstream side of the regulator 222 and the pressure on the downstream side of the regulator 222 in the fuel gas supply flow path 220, so that the pressure on the downstream side is constant.

The first pressure sensor 224 is provided, in the fuel gas supply flow path 220, on the upstream side of the regulator 222 in the direction in which fuel gas is fed from the tank 210 to the fuel cell 100. The first pressure sensor 224 measures pressure on the upstream side of the regulator 222 in the fuel gas supply flow path 220. In the following description, a measurement value of pressure measured by the first pressure sensor 224 is referred to as a first measurement value.

The second pressure sensor 226 is provided on the downstream side of the regulator 222, in the fuel gas supply flow path 220. The second pressure sensor 226 measures pressure on the downstream side of the regulator 222. In the following description, a measurement value of pressure measured by the second pressure sensor 226 is referred to as a second measurement value.

In the first embodiment, the measurement range of the first pressure sensor 224 is 0 to 100 MPa, and the measurement range of the second pressure sensor 226 is 0 to 10 Mpa. The measurement range of the second pressure sensor 226 is smaller than the measurement range of the first pressure sensor 224, and thus the measurement accuracy for low pressure (e.g., 0 to 1 Mpa) in the second pressure sensor 226 is higher than that in the first pressure sensor 224.

The injector 227 is provided in the fuel gas supply flow path 220 on the downstream side of the second pressure sensor 226. The injector 227 adjusts opening and closing of the fuel gas supply flow path 220 to reduce pressure of fuel gas, and feeds the fuel gas to the fuel cell 100. The injector 227 is an electromagnetic drive switching valve, and the controller 400 controls the adjustment of opening and closing of the fuel gas supply flow path 220.

The switching valve 228 is provided on the upstream side of the first pressure sensor 224, in the fuel gas supply flow path 220. The switching valve 228 opens and closes the fuel gas supply flow path 220 to switch execution and stop of supply of fuel gas. The switching valve 228 is an electromagnetic drive switching valve, and is controlled by the controller 400.

The fuel gas supply and discharge system 200 further includes a fuel offgas discharge flow path 230, a discharge valve 232, a fuel gas circulation flow path 240, and a circulation pump 242.

The fuel offgas discharge flow path 230 is connected to the fuel gas supply flow path 220 through a flow path (not illustrated) allowing fuel gas to flow in the fuel cell 100. The fuel offgas discharge flow path 230 is a flow path to discharge fuel offgas discharged from the fuel cell 100 to the outside of the fuel cell system 10.

The discharge valve 232 is provided in the fuel offgas discharge flow path 230. The switching valve 232 adjusts opening and closing of the fuel offgas discharge flow path 230 to switch execution and stop of discharge of fuel offgas. The discharge valve 232 is an electromagnetic drive switching valve, and is controlled by the controller 400.

The fuel gas circulation flow path 240 is branched from the upstream side of the discharge valve 232 in the fuel offgas discharge flow path 230 and connected to the downstream side of the second pressure sensor 226 in the fuel gas supply flow path 220. The fuel gas circulation flow path 240 is a flow path to return fuel offgas discharged from the anode of the fuel cell 100 to the fuel gas supply flow path 220 again.

The circulation pump 242 is a pump for feeding fuel offgas from the fuel offgas discharge flow path 230 to the fuel gas supply flow path 220 through the fuel gas circulation flow path 240. The operation of the circulation pump 242 is controlled by the controller 400.

The oxidizing gas supply and discharge system 300 has an oxidizing gas supply function and an oxidizing gas discharge function. The oxidizing gas supply function is a function for supplying oxidizing gas to a cathode of the fuel cell 100. The oxydizing gas discharge function is a function for discharging oxidizing offgas discharged from the cathode of the fuel cell 100 to the outside. In the first embodiment, the oxidizing gas is air. The oxidizing gas supply and discharge system 300 includes an oxidizing gas supply unit 310.

The oxidizing gas supply unit 310 supplies oxidizing gas used for generating power of the fuel cell 100 to the fuel cell 100. The controller 400 controls execution and stop of the supply of oxidizing gas by the oxidizing gas supply unit 310. The oxidizing gas supply unit 310 includes a compressor 316, an oxidizing gas supply flow path 320, and a flow dividing valve 322. The compressor 316 compresses air taken in from the atmosphere and feeds it to the oxidizing gas supply flow path 320.

The oxidizing gas supply flow path 320 is connected at one end thereof to the compressor 316. The oxidizing gas supply flow path 320 feeds compressed air from the compressor 316 to the fuel cell 100. An oxidizing gas discharge flow path 340 described later is branched from the oxidizing gas supply flow path 320.

The flow dividing valve 322 is arranged at a branching position where the oxidizing gas discharge flow path 340 is branched from the oxidizing gas supply flow path 320. The flow dividing valve 322 is able to adjust amounts of compressed air from the compressor 316 that are distributed to the side of the oxidizing gas supply flow path 320 and to the side of the oxidizing gas discharge flow path 340 on the downstream side from the branching position. The operation of the flow dividing valve 322 is controlled by the controller 400.

The oxidizing gas supply and discharge system 300 further includes an oxidization offgas discharge flow path 330, a regulating valve 332, and an oxidizing gas discharge flow path 340.

The oxidization offgas discharge flow path 330 is connected to the oxidizing gas supply flow path 320 through a flow path (not illustrated) allowing oxidizing gas to flow in the fuel cell 100. The oxidization offgas discharge flow path 330 is a flow path to discharge oxidization offgas discharged from the fuel cell 100 to the outside of the fuel cell system 10. The oxidization offgas discharge flow path 330 is connected to the oxidizing gas discharge flow path 340.

The regulating valve 332 is provided in the oxidization offgas discharge flow path 330. The regulating valve 332 adjusts opening and closing of the oxidization offgas discharge flow path 330 to switch execution and stop of discharge of oxidizing offgas. The regulating valve 332 is an electromagnetic drive switching valve, and is controlled by the controller 400.

The oxidizing gas discharge flow path 340 merges on the downstream side of a position of the discharge valve 232 in the fuel offgas discharge flow path 230. The oxidizing gas discharge flow path 340 feeds air supplied from the compressor 316 to the fuel offgas discharge flow path 230.

The controller 400 controls operation of each unit of the fuel cell system 10. In the first embodiment, the controller 400 controls, when an ignition switch provided on a vehicle with the fuel cell system 10 is turned off, the switching valve 228 to stop supply of fuel gas, and the compressor 316 to stop supply of oxidizing gas, thereby stopping generation of power of the fuel cell 100. Moreover, then the controller 400 controls the injector 227 to close the fuel gas supply flow path 220. The adjustment of opening and closing of the fuel gas supply flow path 220 by the regulator 222 is autonomously performed even when the ignition switch is turned off.

The controller 400 includes a correction unit 410. The correction unit 410 corrects the first pressure sensor 224 based on the second measurement value. In the first embodiment, the correction unit 410 corrects the first pressure sensor 224 assuming that a value resulted by adding a pressure loss between the first pressure sensor 224 and the second pressure sensor 226 to a pressure value indicated by the second measurement value is the first measurement value.

The correction unit 410 corrects the first pressure sensor 224 when the first measurement value is equal to or smaller than a predetermined pressure value SV. Here, the pressure value SV is an upper limit value in a measurement range with high reliability in measurement accuracy of the second pressure sensor 226. When the first measurement value is equal to or smaller than the predetermined pressure value SV, the second measurement value measured by the second pressure sensor 226 is a smaller value than the first measurement value because of a pressure loss between the first pressure sensor 224 and the second pressure sensor 226, and thus it is highly possible that the second measurement value is in a range with high reliability in measurement accuracy. The correction unit 410 corrects the first pressure sensor 224 assuming that a value resulted by adding a pressure loss between the first pressure sensor 224 and the second pressure sensor 226 to a pressure value indicated by such a second measurement value is the first measurement value. In the fuel cell system 10 of the first embodiment, the correction processing described later is performed, whereby it is possible to correct the first pressure sensor 224 with high accuracy even when the first measurement value is larger than the pressure value SV.

A2. Correction Processing

FIG. 2 is a flow illustrating correction processing performed by the controller 400. The correction processing is performed when the ignition switch provided on a vehicle with the fuel cell system 10 is turned off.

As illustrated in FIG. 2, the controller 400 determines, when the correction processing is started, whether the first measurement value measured by the first pressure sensor 224 is equal to or smaller than the pressure value SV (Step S110). When it is determined that the first measurement value is equal to or smaller than the pressure value SV (Yes at Step S110), the controller 400 controls the correction unit 410 to correct the first pressure sensor 224 (Step S120). Thereafter, the controller 400 finishes the correction processing.

When it is determined that the first measurement value is not equal or smaller than the pressure value SV (No at Step S110), that is, when the first measurement value is larger than the pressure value SV, the controller 400 performs pressure reduction processing, and then controls the correction unit 410 to correct the first pressure sensor 224 (Step S130). Thereafter, the controller 400 finishes the correction processing.

In the first embodiment, the pressure reduction processing is processing of controlling the oxidizing gas supply unit 310 to supply oxidizing gas to the fuel cell 100 and controlling the injector 227 to open the fuel gas supply flow path 220, thereby consuming fuel gas in the fuel gas supply flow path 220 on the downstream side of the switching valve 228 while using it for generating power of the fuel cell 100.

FIG. 3 is a timing chart exemplifying the state changes from the execution of pressure reduction processing to the finish of correction of the first pressure sensor 224 after the ignition switch is turned off in the vehicle with the fuel cell system 10. FIG. 3 illustrates time-series changes of the on-off state of the ignition switch, the opening and closing state of the switching valve 228, the first measurement value measured by the first pressure sensor 224, the opening and closing state of the injector 227, and the supply state of oxidizing gas by the oxidizing gas supply unit 310.

The ignition switch is kept on between the timing t0 and the timing t1 in FIG. 3. Here, the switching valve 228 is open, and the injector 227 also opens the fuel gas supply flow path 220. Thus, fuel gas is continuously supplied to the fuel cell 100. Moreover, the oxidizing gas supply unit 310 supplies oxidizing gas to the fuel cell 100, and thus the fuel cell 100 generates power using fuel gas and oxidizing gas.

At the timing t1 of FIG. 3, the ignition switch is turned off. Then, the switching valve 228 is closed to stop supply of fuel gas, and the oxidizing gas supply unit 310 stops supply of oxidizing gas to the fuel cell 100, whereby the power generation of the fuel cell 100 is stopped. Here, the injector 227 is also controlled to close the fuel gas supply flow path 220. The adjustment of opening and closing of the fuel gas supply flow path 220 by the regulator 222 is autonomously performed even when the ignition switch is turned off.

At the timing t2 of FIG. 3, when the switching valve 228 is closed to stop supply of fuel gas and the controller 400 determines that the first measurement value is not equal to or smaller than the pressure value SV, the controller 400 starts pressure reduction processing. Once the pressure reduction processing is started, the controller 400 controls the oxidizing gas supply unit 310 to supply oxidizing gas to the fuel cell 100 and controls the injector 227 to open the fuel gas supply flow path 220.

Between the timing t2 and the timing t3 in FIG. 3, fuel gas in the fuel gas supply flow path 220 on the downstream side of the switching valve 228 is used and consumed to generate power of the fuel cell 100, whereby the first measurement value is reduced.

At the timing t3 of FIG. 3, once the first measurement value becomes equal to or smaller than the pressure value SV, the controller 400 controls the oxidizing gas supply unit 310 to stop supply of oxidizing gas, and controls the injector 227 to close the fuel gas supply flow path 220. Moreover, once the first measurement value becomes equal to or smaller than the pressure value SV, the controller 400 controls the correction unit 410 to correct the first pressure sensor 224. Here, the correction unit 410 corrects the first pressure sensor 224 assuming that a value resulted by adding a pressure loss between the first pressure sensor 224 and the second pressure sensor 226 to a pressure value indicated by the second measurement value V2 is the first measurement value.

After the timing t4 of FIG. 3, the first pressure sensor 224 measures pressure in the fuel gas supply flow path 220 using a value corrected by the correction unit 410.

In the first embodiment described above, the pressure reduction processing is performed when the first measurement value is larger than the pressure value SV to reduce the first measurement value to equal to or smaller than the pressure value SV. Thus, it is possible to correct the first pressure sensor 224 based on the second measurement value measured by the second pressure sensor 226. Therefore, it is possible to suppress errors remaining in the measurement by the first pressure sensor 224.

Moreover, in the first embodiment, in the pressure reduction processing, fuel gas in the fuel gas supply flow path 220 on the downstream side of the switching valve 228 is used and consumed to generate power of the fuel cell 100. Thus, fuel gas is used to generate power of the fuel cell 100, which makes the first measurement value equal to or smaller than the pressure value SV.

B. Second Embodiment

The configuration of the fuel cell system of the second embodiment is same as that of the fuel cell system 10 of the first embodiment. The fuel cell system of the second embodiment is different from the fuel cell system 10 of the first embodiment in concrete processing contents of pressure reduction processing.

In the second embodiment, the pressure reduction processing is processing of controlling the discharge valve 232 to discharge fuel offgas to discharge fuel gas in the fuel gas supply flow path 220 on the downstream side of the switching valve 228 to the fuel offgas discharge flow path 230 as fuel offgas through the flow path, and controlling the oxidizing gas supply unit 310 to supply oxidizing gas to the oxidizing gas discharge flow path 340 to dilute fuel offgas discharged to the fuel offgas discharge flow path 230 with oxidizing gas and discharge it to the outside of the fuel cell system 10. In the second embodiment, the supply of oxidizing gas to the oxidizing gas discharge flow path 340 by the oxidizing gas supply unit 310 is performed by adjusting the flow dividing valve 322 to supply oxidizing gas fed from the compressor 316 to the side of the oxidizing gas discharge flow path 340. Here, the flow dividing valve 322 is adjusted so that oxidizing gas is not supplied to the side of the fuel cell 100.

In the second embodiment described above, fuel gas is diluted with oxidizing gas and discharged to the outside of the fuel cell system 10, which makes the first measurement value equal to or smaller than the pressure value SV.

C. Third Embodiment

The configuration of the fuel cell system of the third embodiment is same as that of the fuel cell system 10 of the first embodiment. The fuel cell system of the third embodiment is different from the fuel cell system 10 of the first embodiment in concrete processing contents of correction processing.

FIG. 4 is a flow illustrating correction processing performed by the controller 400 according to the third embodiment. As illustrated in FIG. 4, the controller 400 determines, when the correction processing is started, whether predetermined time T has elapsed since the correction unit 410 is controlled to correct the first pressure sensor 224 last time (Step S100). Here, the time T is time with less excessive and deficient frequency of correction performed by the correction unit 410.

When it is determined that the time T has elapsed since the correction unit 410 is controlled to correct the first pressure sensor 224 last time (Yes at Step S100), the controller 400 performs each processing after Step S110 described in FIG. 2.

When it is determined that the time T has not elapsed since the correction unit 410 is controlled to correct the first pressure sensor 224 last time (No at Step S100), the controller 400 controls the correction unit 410 not to correct the first pressure sensor 224, and does not perform pressure reduction processing (Step S140). Thereafter, the controller 400 finishes the correction processing.

In the third embodiment described above, when the interval between correction performed by the correction unit 410, that is, the time T is set appropriately, it is possible to correct the first pressure sensor 224 at a frequency with less excess and deficiency.

D. Modifications

D1. Modification 1

In the fuel cell system of each embodiment, the adjustment of opening and closing of the fuel gas supply flow path 220 by the regulator 222 is performed autonomously. However, the disclosure is not limited thereto. For example, the regulator 222 may be an electromagnetic drive switching valve, and the controller 400 may control adjustment of opening and closing of the fuel gas supply flow path 220. In such a case, the opening and closing state of the regulator 222 may be controlled to be synchronized with the on or off state of the ignition switch, and the opening and closing state of the injector 227 when the pressure reduction processing is performed. That is, the controller 400 may control the regulator 222 to open the fuel gas supply flow path 220 when the injector 227 opens the fuel gas supply flow path 220, and control the regulator 222 to close the fuel gas supply flow path 220 when the injector 227 closes the fuel gas supply flow path 220.

D2. Modification 2

The fuel cell system of each embodiment includes the regulator 222 and the injector 227. However, the disclosure is not limited thereto. For example, the fuel cell system may include only the regulator 222. In such a form, the regulator 222 may be an electromagnetic drive switching valve, and the controller 400 may control adjustment of opening and closing of the fuel gas supply flow path 220. In such a form, when the adjustment of opening and closing of the fuel gas supply flow path 220 by the regulator 222 is performed autonomously, the pressure reduction processing is performed by controlling the oxidizing gas supply unit 310 to supply oxidizing gas to the fuel cell 100. That is, in the pressure reduction processing, the adjustment of opening and closing of the fuel gas supply flow path 220 by the regulator 222 is performed autonomously, and thus the controller 400 may control the oxidizing gas supply unit 310 to supply oxidizing gas to the fuel cell 100, thereby consuming fuel gas in the fuel gas supply flow path 220 on the downstream side of the switching valve 228 while using it for generating power of the fuel cell 100.

D3. Modification 3

In the fuel cell system of each embodiment, the oxidizing gas supply unit 310 includes the compressor 316, the oxidizing gas supply flow path 320, and the flow dividing valve 322. However, the disclosure is not limited thereto. For example, the oxidizing gas supply unit 310 may be a single oxidizing gas supply unit having the functions of the compressor 316, the oxidizing gas supply flow path 320, and the flow dividing valve 322. In such a form, the oxidizing gas supply unit is connected to each of the fuel cell 100 and the oxidizing gas discharge flow path 340, and supplies oxidizing gas to the fuel cell 100 and the oxidizing gas discharge flow path 340 in accordance with an instruction by the controller 400.

D4. Modification 4

In the fuel cell system of each embodiment, the correction processing is performed when the ignition switch provided on the vehicle with the fuel cell system is turned off. However, the disclosure is not limited thereto. For example, the correction processing may be performed before the switching valve 228 is opened after the ignition switch is turned on, or during time in which it is highly possible that the fuel cell system is stopped, for example, during night.

D5. Modification 5

In the fuel cell system of the third embodiment, whether the time T has elapsed since the correction unit 410 is controlled to correct the first pressure sensor 224 last time is adopted as a determination reference of whether the correction and pressure reduction processing is to be performed. However, the disclosure is not limited thereto. For example, there may be adopted as a determination reference of whether the correction and pressure reduction processing is to be performed whether the total time of exposition to fuel gas since the first pressure sensor 224 is corrected last time or a measurement error calculated by the measurement error progressive expression regarding the first pressure sensor 224 that is preliminarily stored by the controller 400 exceeds a predetermined value.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In accordance with one aspect of the disclosure, a fuel cell system is provided. The fuel cell system includes a fuel cell, a tank that stores fuel gas used for generating power of the fuel cell, a fuel gas supply flow path that is connected to the tank to feed the fuel gas supplied from the tank to the fuel cell, a first pressure reduction unit that is provided in the fuel gas supply flow path and adjusts opening and closing of the fuel gas supply flow path to reduce pressure of the fuel gas and feed the fuel gas, a first pressure sensor that is provided in the fuel gas supply flow path on an upstream side of the first pressure reduction unit in a feeding direction of the fuel gas to measure pressure in the fuel gas supply flow path, a second pressure sensor that is provided in the fuel gas supply flow path on a downstream side of the first pressure reduction unit to measure pressure in the fuel gas supply flow path, a switching valve that is provided in the fuel gas supply flow path on the upstream side of the first pressure sensor to switch execution and stop of supply of the fuel gas, a correction unit that corrects the first pressure sensor based on a second measurement value measured by the second pressure sensor, and a controller that controls the fuel cell system, in which the controller controls the correction unit to correct the first pressure sensor when the switching valve stops supply of the fuel gas and a first measurement value measured by the first pressure sensor is equal to or smaller than a predetermined value, and performs, when the switching valve stops supply of the fuel gas and the first measurement value is larger than the predetermined value, pressure reduction processing to make the first measurement value equal to or smaller than the predetermined value, and then controls the correction unit to correct the first pressure sensor. In such an aspect, the pressure reduction processing is performed when the first measurement value is larger than the predetermined value, which makes the first measurement value equal to or smaller than the predetermined value. Thus, it is possible to correct the first pressure sensor based on the second measurement value measured by the second pressure sensor. Therefore, it is possible to suppress errors remaining in the measurement by the first pressure sensor, that is, the pressure sensor provided in the fuel gas supply flow path.

(2) In the above-described aspect, the controller controls the correction unit to correct the first pressure sensor when predetermined time has elapsed since the correction unit is controlled to correct the first pressure sensor last time, the switching valve stops supply of the fuel gas, and the first measurement value measured by the first pressure sensor is equal to or smaller than the predetermined value, performs the pressure reduction processing and then controls the correction unit to correct the first pressure sensor when the predetermined time has elapsed since the correction unit is controlled to correct the first pressure sensor last time, the switching valve stops supply of the fuel gas, and the first measurement value is larger than the predetermined value, and controls the correction unit not to correct the first pressure sensor and may not perform the pressure reduction processing when the predetermined time has not elapsed since the correction unit is controlled to correct the first pressure sensor last time and the switching valve stops supply of the fuel gas. In such an aspect, when the predetermined time, that is, the interval between correction performed by the correction unit is set appropriately, it is possible to correct the first pressure sensor at a frequency with less excess and deficiency.

(3) The above-described aspect further includes an oxidizing gas supply unit that supplies oxidizing gas used for generating power of the fuel cell to the fuel cell, in which the pressure reduction processing may be processing of controlling the oxidizing gas supply unit to supply the oxidizing gas to the fuel cell to consume the fuel gas in the fuel gas supply flow path on the downstream side of the switching valve while using the fuel gas for generating power of the fuel cell. In such an aspect, the fuel gas in the fuel gas supply flow path on the downstream side of the switching valve is used to generate power of the fuel cell, which makes the first measurement value equal to or smaller than the predetermined value.

(4) The above-described aspect further includes a second pressure reduction unit that is provided in the fuel gas supply flow path on the downstream side of the second pressure sensor and adjusts opening and closing of the fuel gas supply flow path to reduce pressure of the fuel gas and feed the fuel gas, in which the adjustment of the opening and closing by the first pressure reduction unit is performed autonomously, in accordance with pressure on the upstream side of the first pressure reduction unit and pressure on the downstream side of the first pressure reduction unit, so that the pressure on the downstream side is constant, the adjustment of the opening and closing by the second pressure reduction unit is performed by control of the controller, and the pressure reduction processing may be processing of controlling the oxidizing gas supply unit to supply the oxidizing gas to the fuel cell and controlling the second pressure reduction unit to open the fuel gas supply flow path to consume the fuel gas in the fuel gas supply flow path on the downstream side of the switching valve while using the fuel gas for generating power of the fuel cell. In such an aspect, the fuel gas in the fuel gas supply flow path on the downstream side of the switching valve is used to generate power of the fuel cell, which makes the first measurement value equal to or smaller than the predetermined value.

(5) The above-described aspect further includes an oxidizing gas supply unit that supplies oxidizing gas used for generating power of the fuel cell to the fuel cell, a fuel offgas discharge flow path that is connected to the fuel gas supply flow path through a flow path of the fuel gas provided in the fuel cell to discharge fuel offgas discharged from the fuel cell to outside of the fuel cell system, a discharge valve that is provided in the fuel offgas discharge flow path and adjusts opening and closing of the fuel offgas discharge flow path to switch execution and stop of discharge of the fuel offgas, and an oxidizing gas discharge flow path that merges on the downstream side of a position of the discharge valve in the fuel offgas discharge flow path to feed oxidizing gas supplied from the oxidizing gas supply unit to the fuel offgas discharge flow path, in which the pressure reduction processing may be processing of controlling the discharge valve to discharge the fuel offgas to discharge the fuel gas in the fuel gas supply flow path on the downstream side of the switching valve to the fuel offgas discharge flow path as the fuel offgas through the flow path, and controlling the oxidizing gas supply unit to supply the oxidizing gas to the oxidizing gas discharge flow path to dilute the fuel offgas discharged to the fuel offgas discharge flow path with the oxidizing gas and discharge the fuel offgas to outside of the fuel cell system. In such an aspect, the fuel gas in the fuel gas supply flow path on the downstream side of the switching valve is diluted with oxidizing gas and discharged to the outside of the fuel cell system, which makes the first measurement value equal to or smaller than the predetermined value.

(6) In the above-described aspect, the oxidizing gas supply unit includes a compressor that compresses and feeds the oxidizing gas, an oxidizing gas supply flow path that feeds the oxidizing gas compressed and fed by the compressor to the fuel cell and is connected to the oxidizing gas discharge flow path, and a flow dividing valve that is provided at a branching position of the oxidizing gas discharge flow path branched from the oxidizing gas supply flow path to adjust an amount of the oxidizing gas compressed and fed by the compressor that is distributed to a side of the fuel cell from the branching position and an amount of the oxidizing gas that is distributed to a side of the oxidizing gas discharge flow path, and the pressure reduction processing may be processing of controlling the discharge valve to discharge the fuel offgas to discharge the fuel gas in the fuel gas supply flow path on the downstream side of the switching valve to the fuel offgas discharge flow path as the fuel offgas through the flow path, and adjusting the flow dividing valve and supplying the oxidizing gas fed from the compressor to the side of the oxidizing gas discharge flow path to dilute the fuel offgas discharged to the fuel offgas discharge flow path with the oxidizing gas and discharge the fuel offgas to outside of the fuel cell system. In such an aspect, the fuel gas in the fuel gas supply flow path on the downstream side of the switching valve is diluted with oxidizing gas and discharged to the outside of the fuel cell system, which makes the first measurement value equal to or smaller than the predetermined value.

The aspects of the disclosure are not limited to the fuel cell system, and may be adopted to various aspects such as a vehicle with the fuel cell system, and a method of producing the fuel cell system. Moreover, it is natural that the disclosure is not limited to the above-described aspects, and may be implemented by various aspects without departing from the scope of the disclosure.

What is claimed is:

1. A fuel cell system, comprising:
   a fuel cell;
   a tank configured to store fuel gas for use in generating power by the fuel cell;
   a fuel gas supply flow path connected to the tank, the fuel gas supply flow path being configured to feed the fuel gas supplied from the tank to the fuel cell;
   a first pressure reduction unit provided in the fuel gas supply flow path, the first pressure reduction unit being configured to adjust opening and closing of the fuel gas supply flow path to reduce pressure of the fuel gas and feed the fuel gas;
   a first pressure sensor provided in the fuel gas supply flow path on an upstream side of the first pressure reduction unit in a feeding direction of the fuel gas, the first pressure sensor being configured to measure a first measurement value in the fuel gas supply flow path;
   a second pressure sensor provided in the fuel gas supply flow path on a downstream side of the first pressure reduction unit, the second pressure sensor being configured to measure a second measurement value in the fuel gas supply flow path;
   a switching valve provided in the fuel gas supply flow path on the upstream side of the first pressure sensor, the switching valve being configured to switch execution and stop of supply of the fuel gas;
   a correction unit configured to correct the first pressure sensor based on the second measurement value measured by the second pressure sensor; and
   a controller configured to control the fuel cell system, wherein
   the controller is configured to:
   cause the correction unit to correct the first pressure sensor when the first measurement value measured by the first pressure sensor is equal to or smaller than a predetermined value in a state where the switching valve stops supply of the fuel gas, or perform a pressure reduction processing to cause the first measurement value equal to or smaller than the predetermined value and then cause the correction unit to correct the first pressure sensor when the first measurement value is larger than the predetermined value in a state where the switching valve stops supply of the fuel gas.

2. The fuel cell system in accordance with claim 1, wherein
the controller is configured to:
cause the correction unit to correct the first pressure sensor when the first measurement value measured by the first pressure sensor is equal to or smaller than the predetermined value at a timing when predetermined time has elapsed since the correction unit is controlled to correct the first pressure sensor last time, in the state where the switching valve stops supply of the fuel gas, or
perform the pressure reduction processing and then controls the correction unit to correct the first pressure sensor when the first measurement value is larger than the predetermined value at a timing when the predetermined time has elapsed since the correction unit is controlled to correct the first pressure sensor last time in the state where the switching valve stops supply of the fuel gas, or
cause the correction unit not to correct the first pressure sensor and does not perform the pressure reduction processing at a timing when the predetermined time has not elapsed since the correction unit is controlled to correct the first pressure sensor last time in the state where the switching valve stops supply of the fuel gas.

3. The fuel cell system in accordance with claim 1, further comprising:
an oxidizing gas supply unit configured to supply oxidizing gas to the fuel cell for use in generating power by the fuel cell, wherein
the pressure reduction processing includes processing of causing the oxidizing gas supply unit to supply the oxidizing gas to the fuel cell to thereby consume the fuel gas in the fuel gas supply flow path on a downstream side of the switching valve in generating power by the fuel cell.

4. The fuel cell system in accordance with claim 3, further comprising:
a second pressure reduction unit provided in the fuel gas supply flow path on a downstream side of the second pressure sensor, the second pressure reduction unit being configured to adjust opening and closing of the fuel gas supply flow path to reduce pressure of the fuel gas and feed the fuel gas, wherein
the opening and closing by the first pressure reduction unit is adjusted autonomously in accordance with pressure on the upstream side of the first pressure reduction unit and pressure on the downstream side of the first pressure reduction unit such that the pressure on the downstream side becomes a constant value,
the opening and closing by the second pressure reduction unit is adjusted by control of the controller, and
the pressure reduction processing includes processing of causing the oxidizing gas supply unit to supply the oxidizing gas to the fuel cell and causing the second pressure reduction unit to open the fuel gas supply flow path to thereby consume the fuel gas in the fuel gas supply flow path on the downstream side of the switching valve in generating power by the fuel cell.

5. The fuel cell system in accordance with claim 1, further comprising:
an oxidizing gas supply unit configured to supply oxidizing gas to the fuel cell for use in generating power by the fuel cell;
a fuel offgas discharge flow path connected to the fuel gas supply flow path through a flow path of the fuel gas provided in the fuel cell, the fuel offgas discharge flow path being configured to discharge fuel offgas discharged from the fuel cell to outside of the fuel cell system;
a discharge valve provided in the fuel offgas discharge flow path, the discharge valve being configured to adjust opening and closing of the fuel offgas discharge flow path to switch execution and stop of discharge of the fuel offgas; and
an oxidizing gas discharge flow path connected to the fuel offgas discharge flow path on a downstream side of the discharge valve, the oxidizing gas discharge flow path being configured to feed oxidizing gas supplied from the oxidizing gas supply unit to the fuel offgas discharge flow path, wherein
the pressure reduction processing includes processing of causing the discharge valve to discharge the fuel offgas to thereby discharge the fuel gas in the fuel gas supply flow path on the downstream side of the switching valve to the fuel offgas discharge flow path as the fuel offgas through the flow path, and causing the oxidizing gas supply unit to supply the oxidizing gas to the oxidizing gas discharge flow path to thereby dilute the fuel offgas discharged to the fuel offgas discharge flow path with the oxidizing gas and discharge the fuel offgas to outside of the fuel cell system.

6. The fuel cell system in accordance with claim 5, wherein
the oxidizing gas supply unit includes:
a compressor configured to compress and feeds the oxidizing gas;
an oxidizing gas supply flow path configured to feed the oxidizing gas compressed and fed by the compressor to the fuel cell and is connected to the oxidizing gas discharge flow path; and
a flow dividing valve provided at a branching position of the oxidizing gas discharge flow path branched from the oxidizing gas supply flow path, the flow dividing valve being configured to adjust an amount of the oxidizing gas compressed and fed by the compressor that is distributed to the fuel cell from the branching position and an amount of the oxidizing gas that is distributed to the oxidizing gas discharge flow path, and
the pressure reduction processing includes processing of causing the discharge valve to thereby discharge the fuel offgas to discharge the fuel gas in the fuel gas supply flow path on the downstream side of the switching valve to the fuel offgas discharge flow path as the fuel offgas through the flow path, and adjusting the flow dividing valve to supply the oxidizing gas fed from the compressor to the oxidizing gas discharge flow path to thereby dilute the fuel offgas discharged to the fuel offgas discharge flow path with the oxidizing gas and discharge the fuel offgas to outside of the fuel cell system.

* * * * *